(12) United States Patent
Maclean et al.

(10) Patent No.: US 7,720,028 B2
(45) Date of Patent: May 18, 2010

(54) SYSTEM, APPARATUS AND METHOD OF DETERMINING ASSOCIATED DATA

(75) Inventors: Ian Angus Maclean, Midlothian (GB); Paul Maurice Saunders, Edinburgh (GB); Donald MacGregor Scobbie, Edinburgh (GB)

(73) Assignee: Agilent Technologies, Inc., Santa Clara, CA (US)

( * ) Notice: Subject to any disclaimer, the term of this patent is extended or adjusted under 35 U.S.C. 154(b) by 554 days.

(21) Appl. No.: 11/586,821

(22) Filed: Oct. 26, 2006

(65) Prior Publication Data

US 2007/0097997 A1    May 3, 2007

(30) Foreign Application Priority Data

Oct. 27, 2005    (GB) .................... 0521864.9

(51) Int. Cl.
*H04W 4/00* (2009.01)
(52) U.S. Cl. .............. 370/328; 370/401; 455/422.1
(58) Field of Classification Search ............. None
See application file for complete search history.

(56) References Cited

U.S. PATENT DOCUMENTS 7,123,626 B1 * 10/2006 Feyerabend ............. 370/466
2004/0017798 A1 * 1/2004 Hurtta et al. ............. 370/352
2005/0238031 A1 * 10/2005 Sudhir et al. ............. 370/401

FOREIGN PATENT DOCUMENTS

GB    2 348 778    8/1999

OTHER PUBLICATIONS

Search Report dated Feb. 21, 2006.

* cited by examiner

*Primary Examiner*—Bob A Phunkulh

(57) ABSTRACT

In the field of monitoring communications systems, it is necessary for a monitoring system to be aware of an association of a Mobile Country Code (MCC), a Mobile Network Code (MNC) and an IP Address of a Gateway GPRS Support Node (GGSN) of a first network when a mobile terminal is roaming into a second network. Probes monitoring links with the second network generate transaction data. The transaction data is generated from messages communicated as part of a dialogue to establish a data "tunnel" between a Serving GPRS Support Node (SGSN) of the second network and the GGSN of the first network. The MCC, MNC and IP address data are extracted from the transaction data and used to update an address network name table.

12 Claims, 6 Drawing Sheets

SYSTEM, APPARATUS AND METHOD OF DETERMINING ASSOCIATED DATA

CROSS-REFERENCE TO RELATED APPLICATIONS

This application claims priority from British Patent Application No. 0521864.9, filed on Oct. 27, 2005, which is incorporated by reference in its entirety.

The present invention relates to a system for determining associated data, of the type, for example, that observes at least one transaction associated with activation of a service for support by a node to determine an IP address of the node, a communications network comprising the node and a country comprising the network. The present invention also relates to an apparatus for determining the associated data and a method of determining the associated data.

BACKGROUND ART

In the field of mobile data communications, it is known for mobile terminals to roam from a first network in a first country to a second network in a second country. It is also known, in some circumstances, for users to roam between networks in a same country. When roaming, it is not uncommon for subscribers using the mobile terminals to require mobile data services. Such mobile data services are known to be provided by Global System for Mobile communications (GSM) networks supporting a General Packet Radio Service (GPRS), and third generation (3G) Universal Mobile Telecommunications Systems (UMTS) networks.

As part of the infrastructure supporting both the GPRS service of the GSM networks and the UMTS networks, Serving GPRS Support Nodes (SGSNs) are provided to support mobility and data session management. Additionally, Gateway GPRS Support Nodes (GGSNs) are provided to serve as a gateway between the GSM networks and/or the UMTS networks and an external packet data network, such as the Internet. From a network management perspective, it is desirable to monitor traffic flowing between a given SGSN in a "visited" network in which the mobile terminal is roaming and a given GGSN of a "home" network. Conversely, it is also desirable to monitor traffic flowing between an SGSN of the home network being accessed by a mobile terminal roaming in the home network and a GGSN of another network from which the mobile terminal originates, the another network constituting a home network from the perspective of the mobile terminal. Network management and reporting systems concerned with subscriber roaming must be able to determine both an origin and a final destination of network traffic in order to identify the network from which the traffic originates and the network in which the traffic terminates. This information allows the network in which the mobile terminal is roaming to be identified and also the home network of the mobile terminal to be identified.

GPRS-enabled mobile data networks and UMTS mobile data networks use Internet Protocol (IP) network addresses to route traffic directly from the visited network in which the mobile terminal is roaming to the home network of the mobile terminal.

However, in order for a network management application, for example a billing verification application as used in conjunction with an AcceSS7 network monitoring system produced by Agilent Technologies, Inc., to make use of associations between IP addresses and networks, it is necessary to perform a look-up operation. Therefore, reference is made to a so-called address network name table of MCCs, MNCs and IP addresses, each entry of the table comprising an MCC/MNC/IP address tuple.

Currently, construction of the table is a manual process of providing a spreadsheet of IP Addresses, MCCs, and MNCs, typically carried out by a GPRS Roaming Exchange (GRX) supplier, since the GRX supplier has knowledge of IP addresses being used in different networks. To compile the table, a so-called "protocol analysis session" is run by an administrator of a Roaming Management System (RMS) of the acceSS7 monitoring system on $G_p$ links of the home network to verify IP addresses in the table. Obviously, errors need to be identified, and so a troubleshooting stage needs to take place, but this requires expenditure of time by engineers. Clearly, manual compilation of the table is therefore prone to human error, and even if substantially error free, IP addresses listed in the table can become disused or re-allocated. Hence, compilation of the table is an extremely laborious and time-consuming activity.

Furthermore, as GPRS networks expand and evolve to become UMTS networks, network operators are constantly allocating and reallocating IP addresses to switches. In the case of GPRS and UMTS networks, the GGSNs can have up to 32 active IP addresses each and these are subject to periodic change, for example as a result of network engineering activity, further exacerbating the problem of maintaining accuracy of the table. Additionally, a given network operator can have a number of GGSNs having IP addresses that may be contiguous, but alternatively may be on different subnets. Further, the IP addresses of the GGSNs may be paired-off as dual redundant nodes. Therefore, disparate and unrelated IP addresses may be associated with different GGSNs, resulting in an absence of consistent patterns of IP addresses that could be used by the GRX supplier to simplify the manual process of compiling the address network name table.

Without accurate maintenance of the table, management reporting systems and roaming management systems will not operate correctly, resulting in the generation of false alarms, investigation of which wastes time.

DISCLOSURE OF THE INVENTION

According to a first aspect of the present invention, there is provided a monitoring system for determining an IP address of a node, a communications network comprising the node and a country comprising the network, the system comprising: a monitoring unit arranged to observe at least one transaction associated with activation of a service for support by the node; a processing resource arranged to identify, when in use, from amongst the at least one transaction observed first identification data indicative of the country and second identification data indicative of the network and an IP address associated with the first and second identification data; and a store for storing the association between the extracted IP address and the first and second identification data.

The service may be a data service.

The node may be a Support Node, for example a Gateway GPRS Support Node (GGSN).

The at least one transaction may relate to a Domain Name Service dialogue. Alternatively or additionally, the at least one transaction may relate to establishment of a data tunnel. The at least one transaction may relate to an update concerning an established data tunnel.

According to a second aspect of the present invention, there is provided an apparatus for determining an IP address of a node, a communications network comprising the node and a country comprising the network, the apparatus comprising:

an input for receiving at least one transaction observed and associated with activation of a service for support by the node; a processing resource arranged to identify, when in use, from amongst the at least one transaction observed first identification data indicative of the country and second identification data indicative of the network and an IP address associated with the first and second identification data; and a store for storing the association between the extracted IP address and the first and second identification data.

According to a third aspect of the present invention, there is provided a method of determining an IP address of a node, a communications network comprising the node and a country comprising the network, the method comprising: observing at least one transaction associated with activation of a service supported by the node; identifying from amongst the at least one transaction observed first identification data indicative of the country and second identification data indicative of the network and an IP address associated with the first and second identification data; and storing the association between the extracted IP address and the first and second identification data.

According to a fourth aspect of the present invention, there is provided a use of observing at least one transaction associated with activation of a service for supported by a node to determine an IP address of the node, a communications network comprising the node and a country comprising the network.

It is thus possible to provide a system for determining an IP address of a node, a communications network comprising the node and a country comprising the network more accurately than a manual system. Since a set of IP addresses can be used to define a foreign network, and traffic observed with source and destination point code IP addresses belonging to defined sets of IP addresses can be attributed to the networks associated with each set of IP addresses, respectively, the administrative work involved in the maintenance of IP address based network definitions in a roaming management and reporting system can be minimised. Additionally, by procuring associated data in an automated manner, configuration of the monitoring system is dynamic and the cost of monitoring the network reduced, whilst accuracy of monitoring is increased.

BRIEF DESCRIPTION OF DRAWINGS

At least one embodiment of the invention will now be described, by way of example only, with reference to the accompanying drawings, in which.

DETAILED DESCRIPTION

Figure 1:
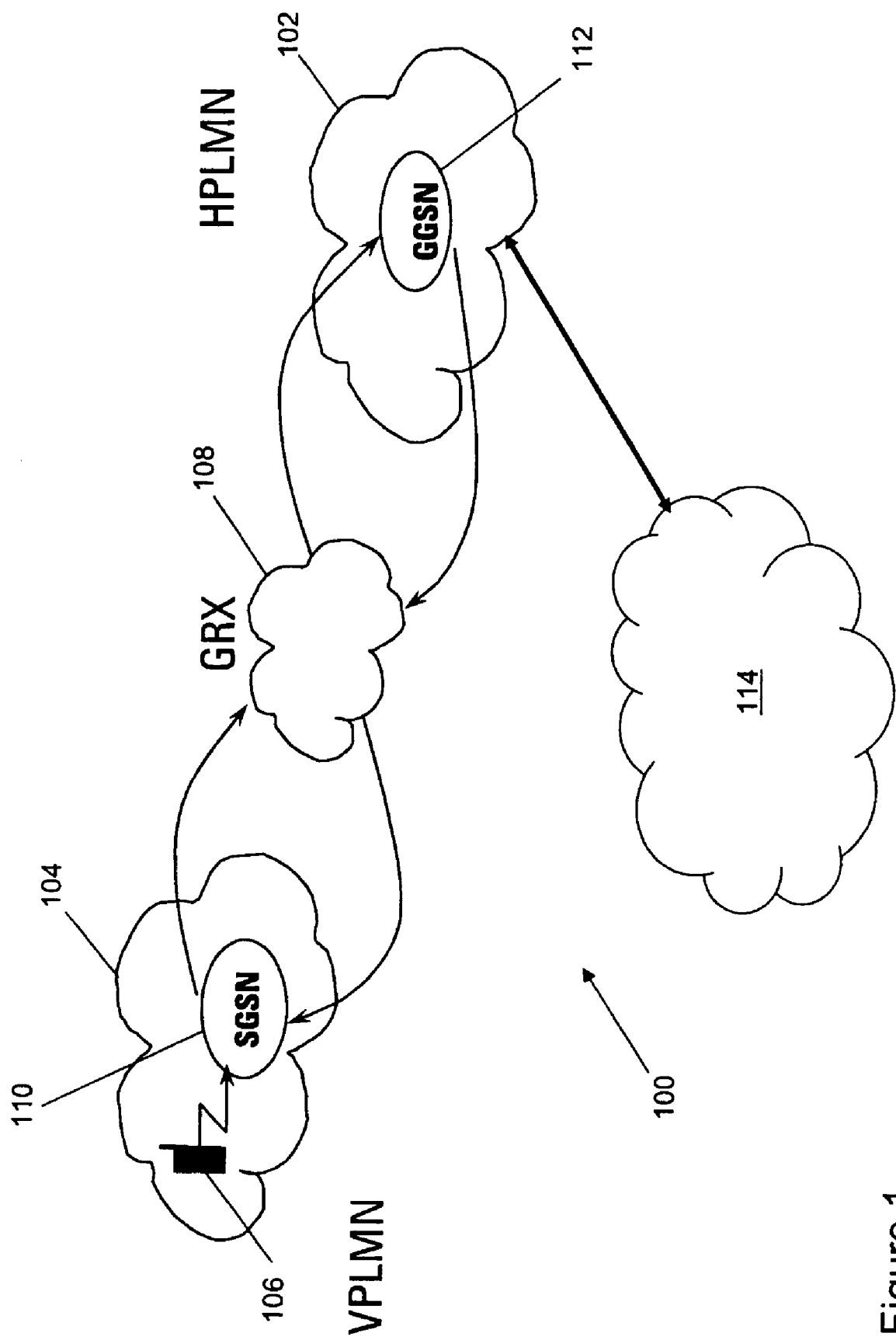
FIG. 1 is a schematic diagram, in overview, of a part of a communications network constituting a first embodiment of the invention.

Throughout the following description identical reference numerals will be used to identify like parts.

Referring to FIG. 1, a communications network 100 comprises a first Public Land Mobile Network (PLMN) 102 of a first network operator and a second PLMN 104 of a second network operator. A mobile terminal 106 associated with a profile of a subscriber held at the first PLMN 102 is roaming in the second PLMN 104, and is sometimes referred to as an "inbound roamer". As such, due to the relationship between the subscription associated with the mobile terminal 106 and the first PLMN 102, the first PLMN 102 is considered to be a Home PLMN (HPLMN). Consequently, the second PLMN 104 in which the mobile terminal 106 is roaming is considered to be a Visited PLMN (VPLMN). The VPLMN 104 comprises a monitoring system, for example an AcceSS7 monitoring system produced by Agilent Technologies, Inc.

A General Packet Radio Service (GPRS) Roaming exchange (GRX) 108 is capable of communicating with the HPLMN 102 and the VPLMN 104 and serves to interconnect the HPLMN and VPLMN 102, 104.

At the VPLMN 104, a Serving GPRS Support Node (SGSN) 110 is provided to support mobility and data session management and is therefore capable of communicating with mobile terminals, for example mobile terminal 106. Of course, it should be appreciated that the VPLMN 104 comprises other SGSNs, but for the purpose of simplicity and hence clarity of description only a single SGSN is initially described herein in relation to FIG. 1. It should also be noted that the HPLMN 102 comprises SGSNs, but the SGSNs at the HPLMN 102 do not participate in the examples contained herein and so to maintain simplicity of description are not shown or described further.

At the HPLMN 102, a Gateway GPRS Support Node (GGSN) 112 is provided to serve as a gateway between the HPLMN 102 and an external packet data network, such as the Internet 114. The VPLMN 104 also comprises a GGSN, but again the GGSN at the VPLMN 104 does not participate in the examples contained herein and so to maintain simplicity of description is not shown in FIG. 1 or described in any detail later herein.

Figure 2:
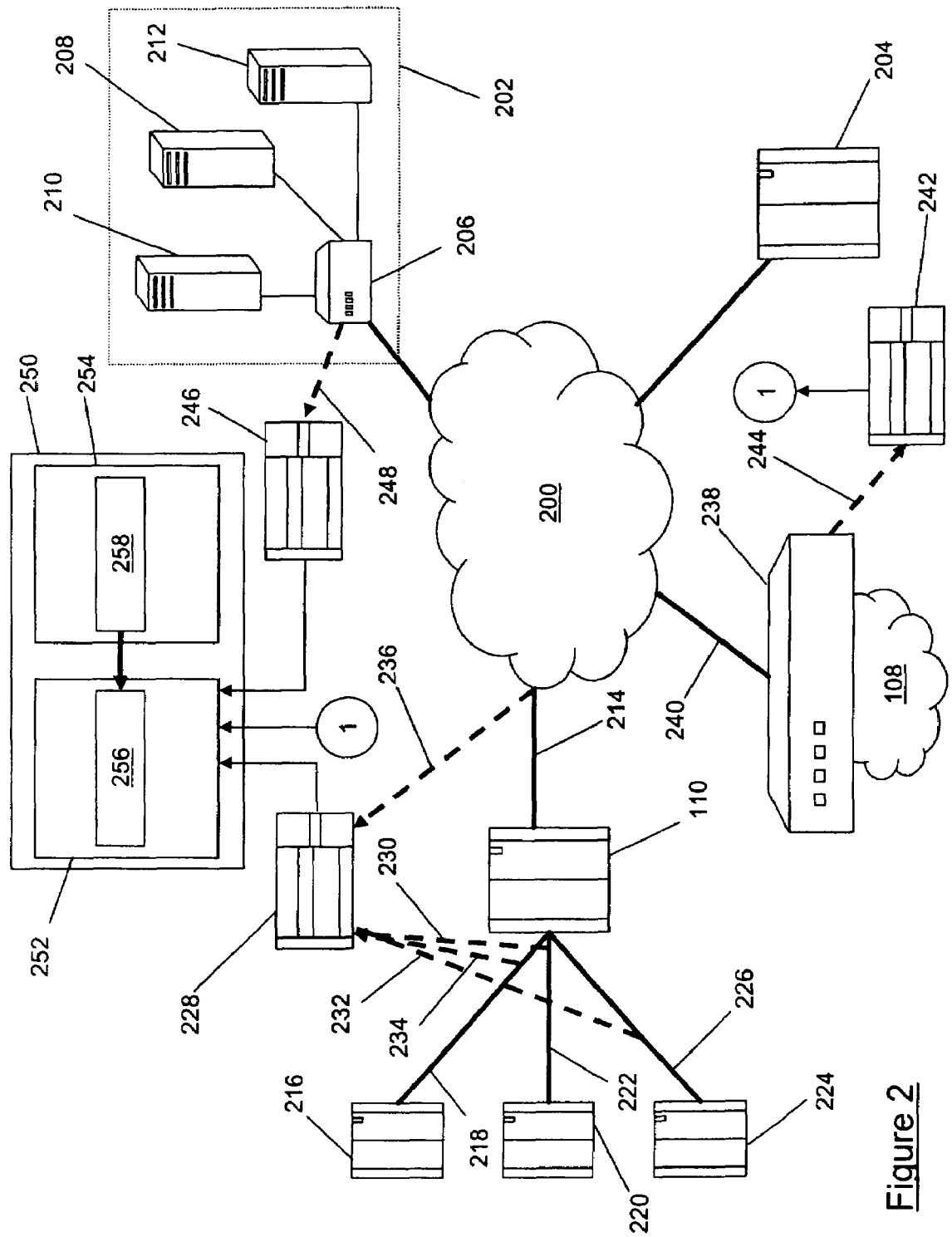
FIG. 2 is a schematic diagram of a home network of FIG. 1.

Turning to FIG. 2, the VPLMN 104 comprises an Internet Protocol (IP) backbone network 200, for example an Asynchronous Transfer Mode (ATM) or Ethernet Local Area Network (LAN). The IP backbone network 200 is coupled to Core Network Support Services 204, and to a GGSN 202 for access to a public Internet (not shown). The Core Network Support Services 204 comprise, for example, a LAN switch 206 coupled to a node (not shown) in the IP backbone network 200, the LAN switch 206 also being coupled to a Domain Name System (DNS) server 208. For completeness, the LAN switch 206 is also coupled to a Remote Authentication Dial-In User Service (RADIUS) server 210, and a Dynamic Host Configuration Protocol (DHCP) server 212.

The IP backbone network 200 is also coupled to the SGSN 110 by a $G_n/G_p$ interface constituting a first link 214, the SGSN 110 being coupled to a UMTS (Universal Mobile Telecommunications System) Terrestrial Access Network (UTRAN) 216 of the VPLMN 104 by an $I_u$-PS interface constituting a second link 218. In this example, the SGSN 110 is also coupled to a GSM/EDGE Radio Access Network (GERAN) 220 by a $G_b$ interface constituting a third link 222. In another embodiment (not described herein), the SGSN 114 can also be coupled to a Signalling Transfer Point (STP) 224 by a $G_r/G_s$ interface constituting a fourth link 226.

In order to monitor traffic passing between the SGSN 110 and the UTRAN 216, the GERAN 220 and the STP 224, a first probe 228 is coupled to the second, third and fourth links 218, 222, 226 by a first tap 230, a second tap 232 and a third tap 234, respectively. In order to monitor traffic between the IP backbone network 200 and the SGSN 110, a fourth tap 236 is coupled to the first link 214.

A router 238 attached to the GRX 108 is also coupled to the IP backbone network 200 via a $G_p$ interface constituting a fifth communications link 240. A second probe 242 is also coupled to the router 238 by a fifth tap 244 in order to monitor traffic on the fifth link 240. Additionally, a third probe 246 is coupled to the LAN switch 206 via a sixth tap 248.

The first, second and third probes 228, 242, 246 are each coupled to a processing resource that supports an acceSS7 network monitoring system 250. In the present example, however, the acceSS7 system 250 is suitably modified to provide a measurement framework functional unit 252 and an attribute manager functional unit 254. The measurement framework functional unit 252 supports a discovery agent process 256 and the attribute manager functional unit 254 supports an auto-configuration agent process 258.

Figure 3:
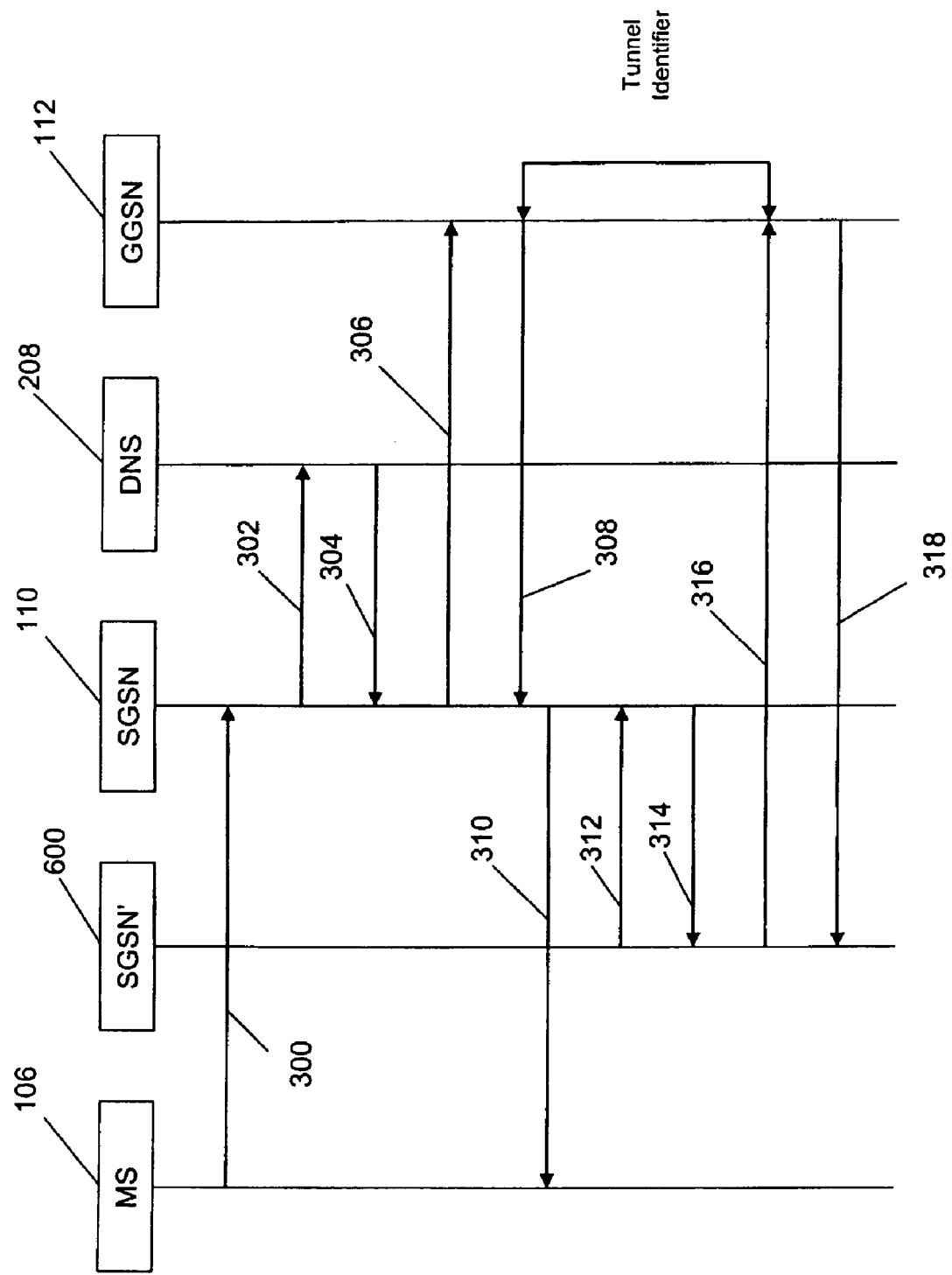
FIG. 3 is a message sequence chart of communications exchanged in relation to the part of the network of FIG. 1 and FIG. 5 below.

In operation (FIG. 3), the mobile terminal 106 is placed in a state of operation, whereby a data service is required, for example, by a user of the mobile terminal 106 opening a web browser, either supported by an operating system of the mobile terminal 106 or by a computing device coupled to the mobile terminal 106. In order to activate the mobile data service, the mobile terminal 106 executes an Activate PDP Context procedure by sending an Activate PDP Context Request message 300 to the SGSN 110 as part of a dialogue, ultimately, to instantiate a data "tunnel" with the GGSN 112. The Activate PDP Context Request message 300 contains an IMSI number of the mobile terminal 106 and a mandatory Access Point Name (APN) for the GGSN 112, the APN being in the form of an Internet domain name, for example "corporate.com". In response to the Activate PDP Context Request message 300, the SGSN 110 recognises the IMSI number of the mobile terminal 106 as belonging to a "foreign" network, because the MCC and MNC components of the IMSI number do not match those of the VPLMN 104. Consequently, the SGSN 110 sends a DNS Query message 302 to the DNS server 208, the SGSN 110 constructing a fully qualified domain name combining the APN and the MCC and MNC data known from the Activate PDP Context Request message 300, for example: "corporate.com.mncXX.mccYYY.gprs", where XX is the MNC data and YYY is the MCC data for the GGSN 112. In this example, although the GRX 108 typically comprises a DNS for a .gprs domain, DNS data associated with the .gprs domain is cached by the DNS server 208 locally for reasons of efficiency.

Figure 4:
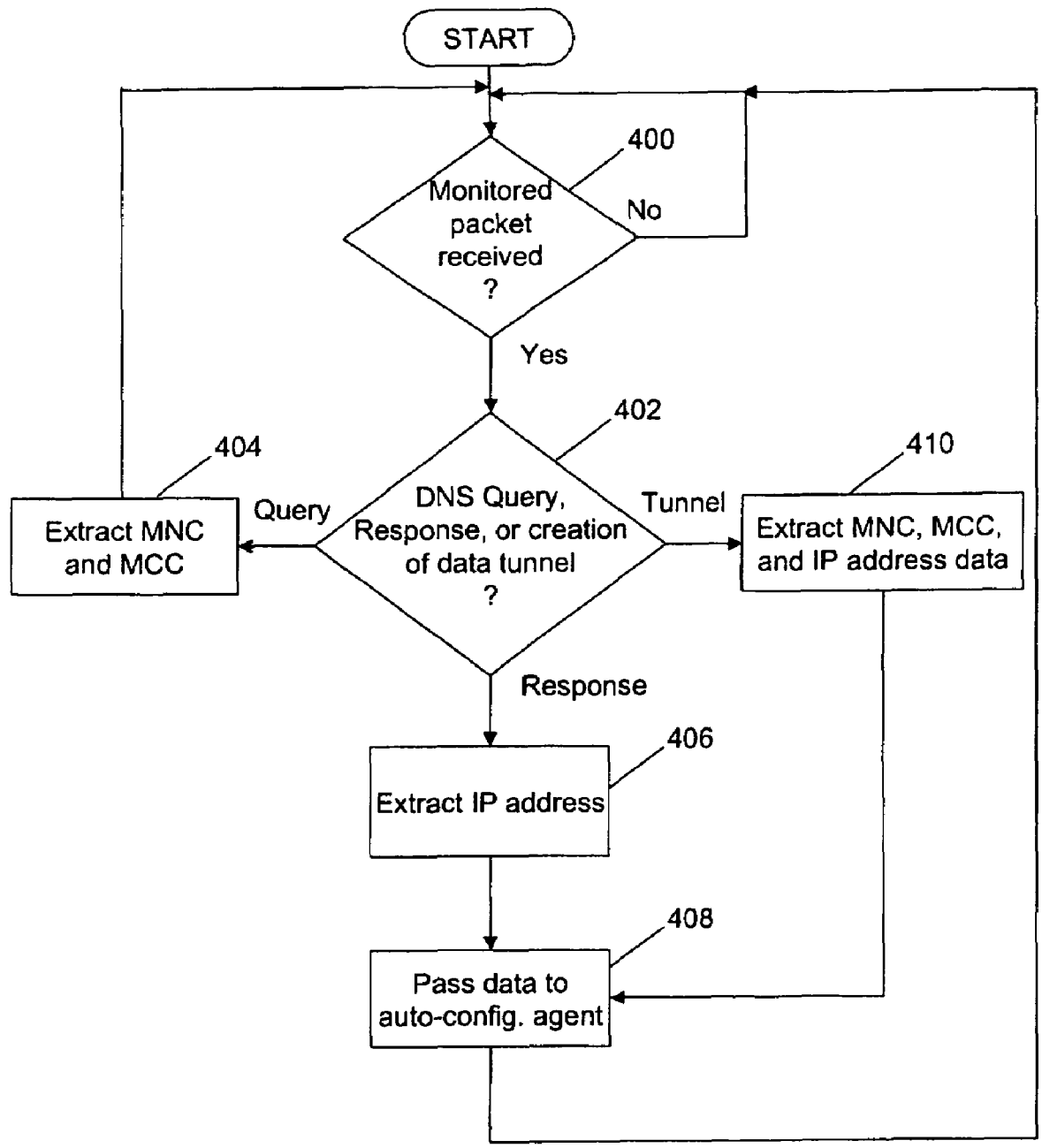
FIG. 4 is a flow diagram of operation of a discovery agent of FIG. 3.

Turning also to FIG. 4, the discovery agent 256 awaits (400) receipt of one or more data feeds from the first, second and third probes 228, 242, 246. The one or more data feeds are feeds of transaction data relating to network signalling data and/or service usage data in relation to the communications links between the SGSN 110 and the DNS server 208, the SGSN 110 and the GRX 108, and, optionally, the SGSN 110 and the GGSN 202. Upon receipt of the transaction data, the discovery agent 256 determines (402) whether any of the transaction data reports detection of a DNS Query message, a DNS Query Response message, or a message as part of the establishment of a data tunnel with a GGSN, for example a Create PDP Context message. As already mentioned above, the DNS Query message 302 has been sent from the SGSN 110 to the DNS server 208 and so first transaction data is received from the third probe 246 reporting detection of the DNS Query message 302. Since the DNS Query message 302 comprises information from the IMSI of the mobile terminal 106; this information is also contained in the first transaction data. In particular, the first transaction data comprises information indicative of a country and communications network with which the subscription of the mobile terminal 106 resides, for example a Mobile Country Code (MCC) and a Mobile Network Code (MNC).

Consequently, the discovery agent 256 extracts (404) the MCC and the MNC from the first transaction data. Thereafter, the discovery agent 256 awaits (400) receipt of second transaction data. Once received, the second transaction data is parsed (402). If the second transaction data, generated by the third probe 246, reports detection of a DNS Query Response message 304 sent from the DNS server 208 to the SGSN 110, then the second transaction data comprises, inter alia, an IP address of the GGSN 112. In fact, the DNS Query Response message 304 can contain a number of IP addresses to which a subsequent Create PDP Context Request can be sent.

Figure 5:
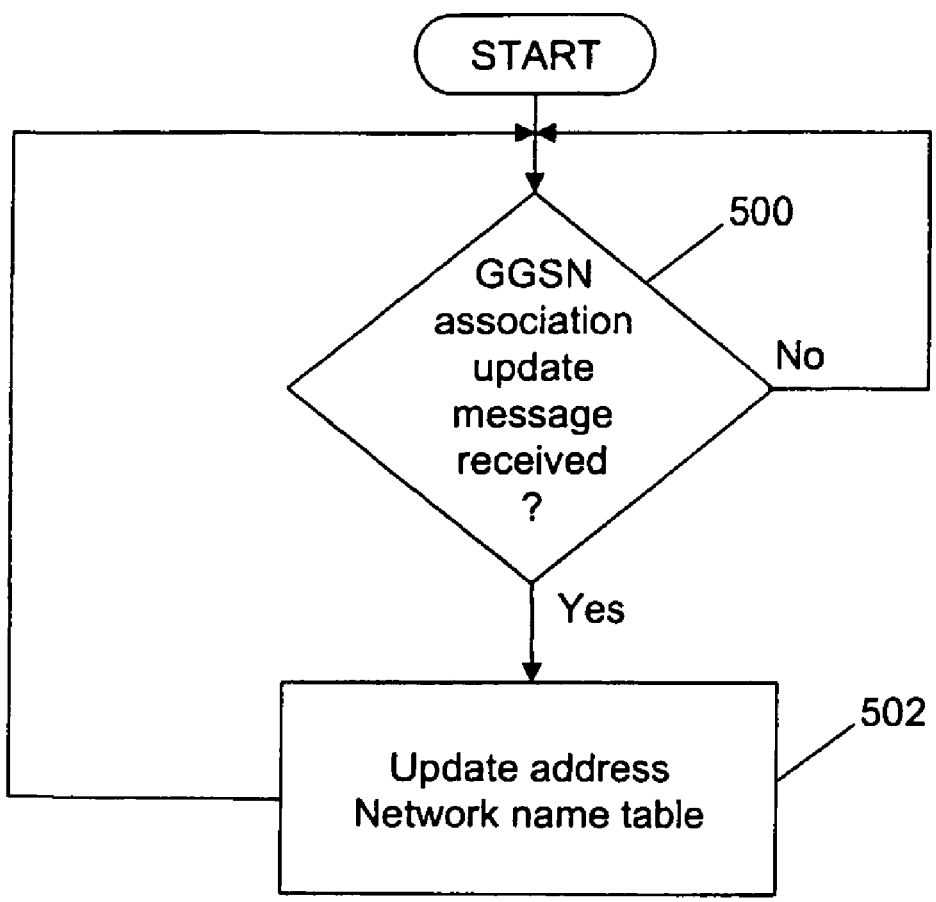
FIG. 5 is a flow diagram of operation of an auto-configuration agent of FIG. 3.

The discovery agent 256 extracts (406) the IP address associated with the MCC and MNC from the second transaction data and sends (408) a GGSN association update message (not shown) to the auto-configuration agent 258, the GGSN association update message comprising the extracted IP address, the MCC and the MNC. Referring to FIG. 5, the auto-configuration agent 258 awaits (500) receipt of a GGSN association update message from the discovery agent 256. Upon receipt of the GGSN association update message, the auto-configuration agent 258 updates (502) an address network name table (not shown) containing entries of IP addresses against MCCs and MNCs.

Whilst the auto-configuration agent 258 is processing the GGSN association update message received form the discovery agent 256, the discovery agent 256 is continuing to await (400) receipt of data feeds from the first, second and third probes 228, 242, 246.

After obtaining DNS data from the DNS server 208, as part of the dialogue for instantiating the data tunnel with the GGSN 112, the SGSN 110 sends a Create PDP Context Request message 306 to the GGSN 112 at the HPLMN 102. Consequently, in another embodiment, the discovery agent 256 uses the Create PDP Context Request message 306 to obtain data identifying the relationship between the IP address, the MCC, and the MNC. In this respect, the discovery agent 256 awaits receipt of third transaction data from the first or second probes 228, 242 relating to the Create PDP Context Request message 306 and identifies (402) the third transaction data relating thereto. The discovery agent 256 then extracts (410) and analyses the MCC and MNC data of the Create PDP Context Request message 306 contained in the third transaction data. If the MCC and MNC data are determined to relate to a "foreign" network, i.e. not the network with which the discovery agent 256 is associated, the discovery agent 256 extracts (410) a destination IP address of the Create PDP Context Request message 306 from the third transaction data, the destination IP address being the IP address of the GGSN 112.

After extracting (410) the MCC, MNC and IP address data from the third transaction data received, the discovery agent 256 sends (408) the extracted information in another GGSN association update message to the auto-configuration agent 258. In a like manner to that described above, the auto-configuration agent 258 continues to await (500) receipt of the another GGSN association update message from the discovery agent 256. Upon receipt of the another GGSN association update message, the auto-configuration agent 258 updates (502) the address network name table with the extracted IP address, MCC and MNC. Of course, if the information associated with the IP address of the GGSN 112 has only just been updated, there is minimal value in performing another update so soon after the last one. However, the above mechanism can be used as an alternative to the two-stage extraction of the IP address, the MCCs and MNCs using the DNS Query and DNS Query Response messages 302, 304.

Thereafter, and in the same way as described above, the discovery agent 256 then continues to await (400) other transaction data relating to other DNS Query or DNS Query Response messages 302, 304, or messages forming part of the establishment of data tunnels.

For completeness, referring back to FIG. 3, upon receipt of the Create PDP Context Request message 306, the GGSN 112 sends a Create PDP Context Response message 308 to the SGSN 110. Thereafter, the SGSN 110 sends an Activate PDP Context Response message 310 to the mobile terminal 106 to confirm completion of establishment of the data service.

Figure 6:
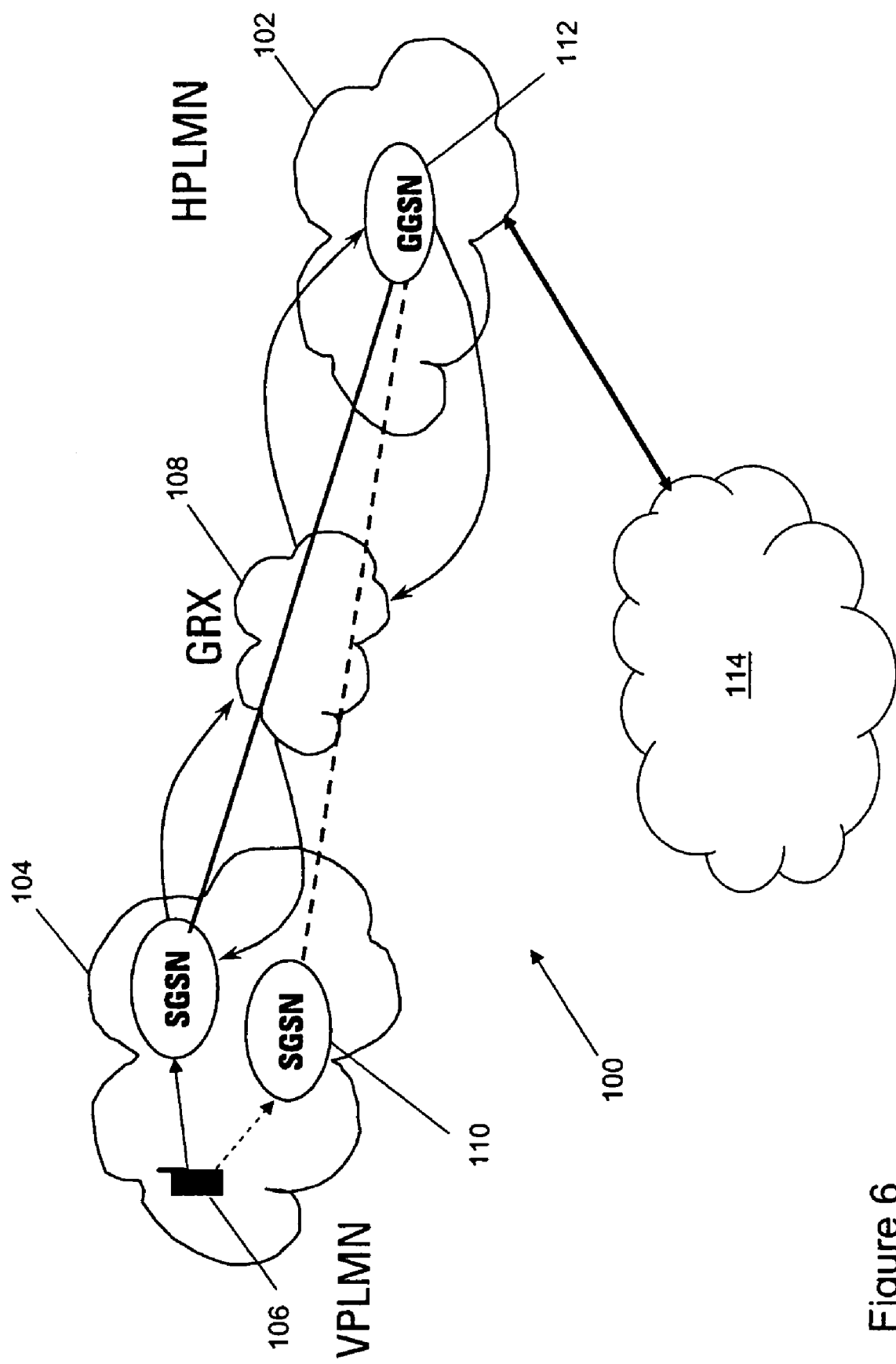
FIG. 6 schematic diagram, in overview, of a roaming mobile terminal in the part of the communications network of FIG. 1 constituting a second embodiment of the invention.

In another embodiment (FIG. 6), instead of the VPLMN 104 comprising the measurement system, the HPLMN 102 comprises the measurement system. Additionally, the mobile terminal 106 is moving from a first location where the mobile terminal 106 is served by the SGSN 110 to a second location where the mobile terminal 106 is served by another SGSN 600 in the VPLMN 104, usually following a handover from a first base station, or Node B (not shown), to a second base station or Node B (not shown).

The another SGSN 600 is therefore required to send an SGSN Context Request message 312 to the SGSN 110. Upon receipt of the SGSN Context Request message 312, the SGSN 110 sends an SGSN Context Response message 314 back to the another SGSN 600. The another SGSN 600 then sends an Update PDP Context Request message 316 to the GGSN 112 to initiate establishment of a data tunnel between the another SGSN 600 and the GGSN 112; the Update PDP Context Request message 316 contains the IP address of the SSGN 112 as well as the MCC and the MNC of the mobile terminal 106.

Referring back to FIG. 4, the discovery agent 256 is continually awaiting (400) receipt of transaction data from the first, second and third probes 228, 242, 246. In this respect, the Update PDP Context Request message 316 sent by the another SGSN 600 to the GGSN 112 is detected by the first probe 228 and fourth transaction data generated containing the IP address of the SSGN 112, and the MCC and MNC data of the mobile terminal 106 from the Update PDP Context Request message 316. The fourth transaction data is subsequently received (400) by the discovery agent 256 for processing and identified (402) as relating to a transaction that is a part of the establishment of a data tunnel.

The discovery agent 256 then extracts (410) and analyses the MCC and MNC data of the Update PDP Context Request message 316 contained in the fourth transaction data. If the MCC and MNC data are determined to relate to a "foreign" network, the discovery agent 256 extracts (410) a destination IP address of the Update PDP Context Request message 316 from the fourth transaction data, the destination IP address being the IP address of the GGSN 112. Once the MCC, MNC and IP address data have been extracted (410) from the fourth transaction data received, the discovery agent 256 sends (408) the extracted information in a GGSN association update message to the auto-configuration agent 258. In a like manner to that described above, the auto-configuration agent 258 continues to await (500) receipt of the GGSN association update message from the discovery agent 256. Upon receipt of the GGSN association update message, the auto-configuration agent 258 updates (502) the address network name table with the extracted IP address, MCC and MNC associating the MCC, the MNC and the IP address of the GGSN 112.

For completeness, upon receipt of the Update PDP Context Request message 316, the GGSN 112 sends an Update PDP Context Response message 318 to the another SGSN 600 to complete establishment of the data tunnel between the another SGSN 600 and the GGSN 112.

The address network name table, updated by one or more of the above described techniques, is accessible to a number of applications, for example a billing verification or interconnect analysis application.

In a further embodiment, the Update PDP Context Request message 316 also bears an IP address of the another SGSN 600. Consequently, in this embodiment, the fourth transaction data also includes the IP address of the another SGSN 600. The discovery agent 256 sends the extracted information including the source IP address of the Update PDP Context Request message 316 in a GGSN association update message to the auto-configuration agent 258. In a like manner to that described above, upon receipt of the GGSN association update message, the auto-configuration agent 258 compares an IP address prefix of the source IP address, for example a Class A, B or C prefix of the source IP address, with corresponding IP address prefixes of IP addresses stored in the address network name table in order to infer an MCC and an MNC most likely to reflect the location of the mobile terminal 106. This information is used for a large number of reasons that are apparent to the skilled person and so will not be recited further herein.

It should also be appreciated that Create PDP Context Request transactions can be used to obtain the source IP address described above.

Although the above embodiment have made specific reference to messages, it should be appreciated that messages forming part of a completed transaction are used for the sake of data integrity.

Alternative embodiments of the invention can be implemented as a computer program product for use with a computer system, the computer program product being, for example, a series of computer instructions stored on a tangible data recording medium, such as a diskette, CD-ROM, ROM, or fixed disk. The series of computer instructions can constitute all or part of the functionality described above, and can also be stored in any memory device, volatile or non-volatile, such as semiconductor, magnetic, optical or other memory device.

What is claimed is:

1. A monitoring system for determining an IP address of a node, a communications network comprising the node and a country comprising the network, the system comprising:
   a monitoring unit arranged to observe at least a first and second transaction associated with activation of a service for support by the node;
   a processing resource arranged to identify, when in use, from the first transaction observed first identification data indicative of the country and second identification data indicative of the network, and from the second transaction an IP address associated with the first and second identification data; and
   a store for storing data indicative of the association between the extracted IP address and the first and second identification data.

2. A system as claimed in claim 1, wherein the service is a data service.

3. A system as claimed in claim 1, wherein the node is a Support Node.

4. A system as claimed in claim 3, wherein the Support Node is a Gateway GPRS Support Node (GGSN).

5. A system as claimed in claim 1, wherein at least one of the first and second transactions relates to a Domain Name Service dialogue.

6. A system as claimed in claim 1, wherein at least one of the first and second transactions relates to establishment of a data tunnel.

7. A system as claimed in claim 1, wherein the at least one of the first and second transactions relates to an update concerning an established data tunnel.

8. A monitoring system for determining an IP address of a node, a communications network comprising the node and a country comprising the network, the system comprising:
- a monitoring unit arranged to observe at least one transaction associated with activation of a service for support by the node;
- a processing resource arranged to identify, when in use, from amongst the at least one transaction observed first identification data indicative of the country and second identification data indicative of the network and an IP address associated with the first and second identification data; and
- a store for storing data indicative of the association between the extracted IP address and the first and second identification data;
- wherein the processing resource is arranged to identify a source IP address associated with the first and second identification data and use at least part of the source IP address to infer from the data stored in the store third identification data indicative of a country and fourth identification data indicative of a network associated with a location of a communications terminal.

9. An apparatus for determining an IP address of a node, a communications network comprising the node and a country comprising the network, the apparatus comprising:
- an input for receiving at least a first and second transaction observed and associated with activation of a service for support by the node;
- a processing resource arranged to identify, when in use, from the first transaction observed first identification data indicative of the country and second identification data indicative of the network and from the second transaction an IP address associated with the first and second identification data; and
- a store for storing the association between the extracted IP address and the first and second identification data.

10. A method of determining an IP address of a node, a communications network comprising the node and a country comprising the network, the method comprising:
- observing at least a first and second transaction associated with activation of a service supported by the node;
- identifying from the first transaction observed first identification data indicative of the country and second identification data indicative of the network and from the second transaction an IP address associated with the first and second identification data; and
- storing data indicative of the association between the extracted IP address and the first and second identification data.

11. A computer program code element embodied on a computer readable storage medium, the computer program code element comprising computer program code means to make a computer execute the method as claimed in claim 10.

12. A method of determining an IP address of a node, a communications network comprising the node and a country comprising the network, the method comprising:
- observing at least one transaction associated with activation of a service supported by the node;
- identifying from amongst the at least one transaction observed first identification data indicative of the country and second identification data indicative of the network and an IP address associated with the first and second identification data;
- storing data indicative of the association between the extracted IP address and the first and second identification data;
- identifying a source IP address associated with the first and second identification data; and
- using at least part of the source IP address to infer from the stored data third identification data indicative of a country and fourth identification data indicative of a network associated with a location of a communications terminal.

* * * * *